United States Patent [19]

Stensaas

[11] Patent Number: 4,589,225

[45] Date of Patent: May 20, 1986

[54] PLANT FERTILIZATION USING A MICROBIOLOGICAL SYSTEM FOR PHOSPHORUS EXTRACTION AND DISTRIBUTION

[76] Inventor: Larry J. Stensaas, 130 S. 1300 East, Apt. 311, Salt Lake City, Utah 84101

[21] Appl. No.: 474,354

[22] Filed: Mar. 11, 1983

[51] Int. Cl.$^4$ .............................................. A01G 1/04
[52] U.S. Cl. ........................................... 47/58; 71/6; 71/64.13; 47/57.6
[58] Field of Search ................................ 47/1, 58–59, 47/57.6, 48.5; 71/6–7, 64.13

[56] References Cited

U.S. PATENT DOCUMENTS

| | | |
|---|---|---|
| 947,795 | 2/1910 | Coates . |
| 947,796 | 2/1910 | Coates . |
| 1,252,332 | 1/1918 | Earp-Thomas . |
| 1,361,597 | 12/1920 | Lipman . |
| 1,988,307 | 3/1933 | Fay ........................................ 47/1 |
| 2,995,867 | 8/1961 | Burton .................................... 47/1 |
| 3,059,379 | 10/1962 | Attoe .................................. 47/48.5 |
| 3,115,404 | 12/1968 | Carney .................................... 71/6 |
| 3,472,644 | 10/1969 | Woodside et al. ....................... 71/1 |
| 3,905,152 | 9/1975 | Loperfido ............................ 47/57.6 |
| 3,916,564 | 11/1975 | Crowell, Sr. ........................ 47/48.5 |
| 4,051,628 | 10/1977 | Knapp ................................ 47/48.5 |
| 4,056,898 | 11/1977 | Brucato et al. ..................... 47/48.5 |
| 4,061,488 | 12/1977 | Mann ................................... 71/77 |
| 4,121,525 | 10/1978 | Courtis ............................ 47/1.1 X |
| 4,136,486 | 1/1979 | Franklin, Jr. et al. ................ 47/58 |
| 4,155,737 | 5/1979 | Dommergues et al. ................ 71/7 |

(List continued on next page.)

FOREIGN PATENT DOCUMENTS

| | | | |
|---|---|---|---|
| 49-17099 | 4/1974 | Japan .................................. 47/1.1 |
| 49-47826 | 12/1974 | Japan .................................. 47/1.1 |
| 7113485 | 4/1973 | Netherlands ......................... 47/1.1 |
| 1176188 | 1/1970 | United Kingdom .................. 47/1.1 |

OTHER PUBLICATIONS

Marx et al., "Mycorrhizae and Containerized Forest Tree Seedlings," Proceedings of the North American Containerized Forest Tree Seedling Symposium, 85–91 (Aug. 1974).

(List continued on next page.)

*Primary Examiner*—Robert E. Bagwill
*Attorney, Agent, or Firm*—Workman, Nydegger & Jensen

[57] ABSTRACT

A primary package, and method of its production, for transferring soluble phosphorus from a secondary package within the primary package to plant root systems without adsorptive loss of phosphorus to surrounding soil constituents.

The secondary package contains insoluble rock phosphate particles and a second contingent of microorganisms in a nutrient hydrogen mocroenvironment which allows the microorganisms to act on those phosphate particles to create soluble forms of phosphorus. Alternatively, the secondary package contains granules of commercially refined phosphorus fertilizer packaged to dissolve in a regulated, timed-release fashion.

The primary package comprises a cellulosic support device which may be wet, moist or dry, and within which the secondary package is supported along with a vector plant seed or seedling and propagules of primary, plant-beneficial microorganisms. The primary package may be formed into desired configurations and may contain self-adhesive or gel-forming materials.

The primary package system is introduced into soil and, under proper environmental conditions, a vector plant develops and the microorganisms become active and form a symbiotic relationship with the vector plant. The growing plant provides a vehicle for inoculating other nearby plant roots with the microorganisms. The microorganisms then transfer soluble phosphorus from the secondary package to the vector plant and then to other plants by a process of translocation. The vector plant may also serve as a buffer for soluble phosphorus and as an agent for the conversion of inorganic to organic forms of soluble phosphorus through its conversion to biomass.

8 Claims, 7 Drawing Figures

U.S. PATENT DOCUMENTS

| | | | |
|---|---|---|---|
| 4,158,269 | 6/1979 | Williams et al. | 47/48.5 |
| 4,204,364 | 5/1980 | Maul et al. | 47/1.1 |
| 4,224,048 | 9/1980 | Pendergast | 71/11 |
| 4,229,544 | 10/1980 | Haynes et al. | 47/59 |
| 4,294,037 | 10/1981 | Mosse et al. | 47/59 |
| 4,311,477 | 1/1982 | Kitamura et al. | 47/1.1 X |
| 4,345,403 | 8/1982 | Giovannetti | 47/1.1 |
| 4,367,609 | 1/1983 | Lloyd | 47/57.6 |

OTHER PUBLICATIONS

Azcon et al., "Comparative Role of Phosphate in Soil or Inside the Host on the Formation and Effects of Endomycorrhiza," 49 Plant and Soil 49, 561-67 (1978).

Scannerini et al., "Ultrastructural Cytochemical Demonstration of Polysaccharides and Proteins Within the Host-Arbuscule Interfacial Matrix in an Endomycorrhiza," 83 New Phytologist, 87-94 (1979).

Azcon et al., "Factors Affecting the Vesicular-Arbuscular Infection and Mycorrhizal Dependency of Thirteen Wheat Cultivars," 87 New Phytologist, 87, 677-87 (1981).

Tinker, "Effects of Vesicular-Arbuscular Mycorrhizas on Higher Plants," 29th Symposium Society Experimental Biology (Ed. by D. G. Jennings and D. L. Lee), 325-348 (1975).

Barea et al., "Possible Synergistic Interactions Between Endogone and Phosphate-Solubiling Bacteria in Low-Phosphate Soils," Endomycorrhizas (Ed. by Sanders, Mosse, Tinker), 408-17 (1975).

Menge et al., "Effect of Heat Treatment and Three Pesticides Upon the Growth and Reproduction of the Mycorrhizal Fungus Glomus Fasciculatus," 832 New Phytologist 473-480 (1979).

Barea et al., "Effects of Introduced and Indigenous VA Mycorrhizal Fungi on Nodulation, Growth and Nutrition of Medicago Sativa in Phosphate-Fixing Soils as Affected by Fertilizers," 54 Plant and Soil, 283-96 (1980).

Rhodes et al., "Phosphate Uptake Zones of Mycorrhizal and Non-Mycorrhizal Onions," 75 New Phytologist 555-561 (1975).

Black et al., "The Development of Endomycorrhizal Root Systems. II. Effect of Agronomic Factors and Soil Conditions on the Development of Vesicular-Arbuscular Mycorrizal Infection in Barley and on the Endophyte Spore Density," 83 New Phytologist, 401-13 (1979).

Ruehle et al., "Fiber, Food, Fuel and Fungal Symbionts," 206 Science, 419-422 (1979).

Bowen et al., "Phosphate Physiology of Vesicular-Arbuscular Mycorrhizas," Encomycorrhizas (Ed. by Sanders, Mosse, Tinker) 241-58 (1975).

Sanders et al., "The Development of Endomycorrhizal Root Systems: I. Spread of Infection and Growth-Promoting Effects with Four Species of Vesicular-Arbuscular Endophyte," 78 New Phytologist, 257-268 (1977).

Callow et al., "Detection and Estimation of Polyphosphate in Vesicular-Arbuscular Mycorrhizas," 80 New Phytologist, 125-34 (1978).

Powell, "Effect of Mycorrhizal Fungi on Recovery of Phosphate Fertilizer From Soil by Ryegrass Plants," New Phytologist (1979).

Cooper et al., "Translocation and Transfer of Nutrients in Vesicular-Arbuscular Mycorrhizas, II, Uptake and Translocation of Phosphorus, Zinc and Sulphur," 81 New Phytologist, 43-52 (1978).

Rabatin, "Seasonal and Edaphic Variation in Vesicular-Arbuscular Mycorrhizal Infection of Grasses by Glomus Tenuis," New Phytologist 95-102 (1979).

Cooper et al., "Nutrients in Vesicular-Arbuscular Mycorrhizas. IV. Effect of Environmental Variables on Movement of Phosphorus," 85 New Phytologist, 312-38 (1981).

Reid, "Effect of Water Stress on Phosphorus Uptake by Mycorrhizas of Pinus Radiata," 83 New Phytologist, 103-107 (1979).

Cox et al., "Ultrastructure of the Host-Fungus Interface in a Vesicular-Arbuscular Mycorrhiza," 73 New Phytologist, 901-12 (1974).

Powell, "Development of Mycorrhizal Infections From Endogone Spores and Infected Root Segments," 66(3) Transactions, British Mycological Society, 439-445 (1976).

Cox et al., "Translocation and Transfer of Nutrients in Vesicular-Arbuscular Mycorrhizas. III. Polyphosphate Granules and Phosphorus Translocation," 84 New Phytologist, 649-59 (1980).

Powell et al., Mycorrhizal Fungi Stimulate Uptake of Soluble and Insoluble Phosphate Fertilizer From a Phosphate-Deficient Soil," 80 New Phytologist, 351-358 (1978).

Crush et al., "Preliminary Results on the Production of Vesicular-Arbuscular Mycorrhizal Inoculum by Freeze Drying," Endomycorrhizas (Ed. by Sanders, Mosse, Tinker) 485-93 (1975).

Powell, "Inoculation of White Clover and Ryegrass Seed with Mycorrhizal Fungi," 83 New Phytologist, 81-85 (1979).

Daniels et al., "Glomus Epigaeus sp.nov., A Useful Fungus for Vesicular-Arbuscular Mycorrhizal Research," 57 Canadian Journal of Botany, 539-42 (1979).

Ocampo et al., "Influence of Plant Interactions on Vesicular-Arbuscular Mycorrhizal Infections, II, Crop Rotations and Residual Effects of Non-Host Plants" 85 New Phytologist, 333-341 (1981).

Daniels et al., "Evaluation of the Commercial Potential of the Vesicular-Arbuscular Mycorrhizal Fungus, Glomus Epagaeus," 85 New Phytologist, 344-54 (1981).

Owusu-Bennoah et al., "Plant Growth Responses to Vesicular-Arbuscular Mycorrhiza, IX, Field Inoculation Responses in Barley, Lucerne and Onion," 83 New Phytologist, 671-679 (1979).

Hall, "Soil Pellets to Introduce Vesicular-Arbuscular Mycorrhizal Fungi into Soil," 11 Soil Biology Chemistry, 85-86 (1979).

Owusu-Bennoah et al., "Effects of Vesicular-Arbuscular Mycorrhiza on the Size of the Labile Pool of Soil Phosphate," 54 Plant and Soil, 233-242 (1980).

Heap et al., "The Influence of Vesicular-Arbuscular Mycorrhizas on Phosphorus Transfer Between Plants," 84 New Phytologist, 173-82 (1980).

Mosse et al., "Vesicular-Arbuscular Mycorrhizal Infections in Root Organ Cultures," 73 New Phytologist 238-241 (1974).

Hirrel et al., "Enhanced Carbon Transfer Between Onions Infected with a Vesicular-Arbuscular Mycorrhizal Fungus," 83 New Phytologist, 731-38 (1979).

Mosse et al., "Plant Growth Responses to Vesicular-Arbuscular Mycorrhiza, IX. Interactions Between (List continued on next page.)

OTHER PUBLICATIONS

VA Mycorrhiza, Rock Phosphate and Sybiotic Nitrogen Fixation," 76 New Phytologist, 331–342 (1976).
Hepper et al., "Techniques to Study the Interaction Between Endogone and Plant Roots," Endomycorrhizas (Ed. by Sanders, Mosse, Tinker) 66–74 (1975).
Nicholson, "Evolution of Vesicular-Arbuscular Mycorrhizas," Endomycorrhizas (Ed. by Sanders, Mosse, Tinker) 25–33 (1975).
Mosse, "The Establishment of Vesicular-Arbuscular Mycorrhiza Under Aseptic Conditions," 27 Journal of General Microbiology, 509–520 (1962).
Mosse, "Advances in the Study of Vesicular-Arbuscular Mycorrhiza," 11 Annual Review Phytopathology, 171–196 (1973).
Mosse, "Plant Growth Responses to Vesicular-Arbuscular Mycorrhiza. IV. In Soil Given Additional Phosphate," 72 New Phytologist, 127–136 (1973).
Khan, "Growth Effects of VA Mycorrhiza on Crops in the Field," Endomycorrhizas (Ed. by Sanders, Mosse, Tinker) 419–433 (1975).
Manjunath et al., "Components of VA Mycorrhizal Inoculum and Their Effects on Growth of Onion," 85 New Phytologist 354–362 (1981).
Menge et al., "Phosphorus Concentrations in Plants Responsible For Inhibition of Mycorrhizal Infection," 80 New Phytologist, 575–378 (1978).

PLANT FERTILIZATION USING A MICROBIOLOGICAL SYSTEM FOR PHOSPHORUS EXTRACTION AND DISTRIBUTION

BACKGROUND

1. Field of the Invention

The present invention relates to an improved method and apparatus for producing, packaging and deploying beneficial symbiotic mycorrhizal fungi and actinomycete bacteria in association with a source of phosphorus in order to fertilize crops or other plants. The present invention thus relates to a system of plant fertilization utilizing microorganisms for extracting phosphorus from rock phosphate, soil, or commercially refined phosphate sources and distributing these materials to plant root systems without adsorptive loss to clay minerals and other soil constituents.

2. Related Applications

The present application is a continuation-in-part of my copending applications Ser. No. 294,681 filed Aug. 20, 1981, entitled "Microbiological System For Phosphate Extraction and Distribution to Plant Root Systems," and Ser. No. 294,682 filed Aug. 20, 1981, entitled "Preparation of Microorganisms For Use in Soil Innoculation," which are incorporated herein by reference.

3. The Prior Art

It is well known that plants grown in soils which are deficient in soluble phosphorus benefit from association with mycorrhizal fungi (hereinafter referred to as MF) and that similar associations are also formed by actinomycete bacteria (hereinafter referred to as AB). The fungal associations are formed by microorganisms belonging to the family Endogonaceae which constitute two morphological groups: (1) Ectomycorrhizae form principally on the roots of woody plants which include economically important families of forest trees. (2) Endomycorrhizae, also commonly known as vesicular-arbuscular mycorrhizae (hereinafter referred to as VAM), colonize the roots of most food crop plants. Both the endomycorrhizal and ectomycorrhizal fungi develop symbiotic associations with roots of the plant root system, receiving carbohydrates and other nourishment from the plant while directly benefiting the plant by transferring to it phosphorus, water, and other constituents from the soil through a hyphal network.

The uptake of phosphorus by MF can occur in soils deficient in soluble phosorus due to a low threshold for phosphorus retrieval. Furthermore, the ability of the fungus to form an extensive hyphal network in the soil surrounding the plant root permits phosphorus recovery from a large volume of soil since there may be up to 80 cm of hyphae for each cm of root infected by vesicular-arbuscular endomycorrhizal fungi and an even greater mass for ectomycorrhizal fungi. Individual hyphae project up to 10 cm from the root system of the host plant, thereby penetrating the zone of depletion adjacent to the root cortex and greatly extending the effective volume of soil from which phosphorus, water and other constituents can be extracted.

Phosphorus transfer from the soil to the plant is accomplished within MF by a process termed translocation. MF first concentrate the extracted phosphorus in polyphosphate granules within the cell cytoplasm and then move the granules from soil and inter-root hyphae through the external hyphal net and finally into the plant root through an internal hyphal net. In the case of endomycorrhizal fungi, phosphorous exchange and entry into the plant is believed to occur in part by means of specialized terminal structures or arbuscles, which arise from the internal net and invaginate cells of the root cortex.

Although the use of MF to encourage plant growth has been shown to be feasible and desirable, they have not been employed on a widespread commercialized basis since methods have not been perfected to produce and package MF propagules on a large scale.

An apparent limitation to the production of VAM fungi used in prior applications is the inability to induce these microorganisms to grow and reproduce by means of pure in vitro cultures commonly employed to propagate fungi on a commercial scale. The lack of a technique for producing an effective VAM inoculum by means of a culture technique devoid of plant cells presents an extremely difficult, if not an impossible, challenge to production on a large scale.

Thus, what is needed is a practical means by which MF and AB can be used for encourgaging plant growth in commercial applications. This would require a method for mass producing efficient species of MF and AB in sufficient quantities for large-scale distribution. This would also require that the microorganisms remain viable during storage, transport and implantation into the soil. In addition, the microorganisms would also have to efficiently colonize the roots of host plants so that the latter may benefit from the transfer of phosphorus and other soil constituents.

It is also well known that phosphorus must be in a water soluble form in order to be utilized by plants. Most soils are deficient in such soluble forms of phosphorus despite the fact that some may have moderate to high levels of insoluble or unavailable phosphorus in the form of natural minerals, organic phosphorus compounds, and clay minerals containing adsorbed phosphorus.

In order to satisfy the continuing agricultural need for soluble phosphorus, chemical refinement processes have been utilized commercially to obtain soluble phosphorus from rock, mineral and other phosphates which are soluble in acid. Such chemical processes are not only complex and energy-intensive, but they generally require "high-grade" rock phosphate, the natural United States sources of which are becoming depleted.

It is common practice to apply a refined phosphorus fertilizer directly to the soil prior to the growing season in order to provide a source of soluble phosphorus; however, no means has been provided for preventing loss of this soluble phosphorus while in the soil through adsorption by clay minerals. A high proportion, often in excess of sixty percent (60%), of the soluble phosphorus applied as fertilizer to argillaceous soils may be lost due to adsorption of phosphorus by clay and iron minerals, or by incorporation into organic compounds which are normal soil constituents. The phosphorus adsorbed by the clay minerals becomes irreversibly bound leading to permanent loss of much of the phosphorus fertilizer applied to the soil.

A further problem with direct application of soluble phosphorus fertilizers to the rhizosphere of the plant root system is a condition referred to as phosphorus toxicity. This condition occurs when the phosphorus within a plant exceeds optimal levels for growth, and it may result in stunting. Thus, the application of fertilizer granules of soluble phosphorus may produce an initially high level of phosphorus in the soil and may result in decreased growth in the nearby plants.

In seeking to overcome these problems, attempts have previously been made to utilize unrefined rock-phosphates or microorganisms or combinations thereof in a soil environment near plant root systems in order to provide soluble phosphorus to those root systems. These attempts have been based on the understanding that soluble phosphorus compounds may be derived from natural minerals and organic phosphorus compounds through the action of bacterial microorganisms, as well as by organic and inorganic acids. Such attempts are reflected in the disclosures of U.S. Pat. Ser. Nos. 947,795, 1,361,597, and 4,155,737. However, these attempts have not succeeded in providing a stable microenvironment necessary for sustaining growth of the bacterial microorganisms capable of converting insoluble into soluble phosphorus compounds.

In the past, attempts to produce soluble phosphate from existing insoluble sources within the soil have generally been unworkable. Most soils in temperate climates do not provided the conditions of low pH which are conducive to the spontaneous conversion of insoluble forms of phosphorus to soluble forms of phosphorus. Insolubility may thus be related in part to a neutral or alkaline soil pH and to a lack of other inorganic and organic factors in the soil which would favor the conversion of insoluble to soluble forms of phosphorus. The problem of providing a substantial mineral or other unrefined source of soluble phosphate for plant fertilization in most types of soils has not been suitably solved by the prior art.

Laboratory and limited field experiments have utilized MF microorganisms for securing and transferring naturally occurring phosphorus from the soil to adjacent plant root systems. In vitro laboratory tests and recent field experiments have also demonstrated that certain MF are capable of translocating soluble phosphorus from a plant with high levels of phosphorus to a plant which is deficient in phosphorus. However, high levels of soluble phosphorus may reduce the incidence of MF associated with the plant roots, and none of the above-described methods and devices provide a full and workable organic approach to the problem of supplying soluble phosphorus to plants either in sufficient quantity or without loss through adsorption.

What is needed to fully overcome the deficiencies of the prior art is a means for the controlled mobilization of soluble phosphorus from one or more sources and its transfer to plant root systems without appreciable loss to clay minerals and other adsorptive constituents within the surrounding soil. It would be a further important improvement to provide a means for supplying phosphorus to plant systems from unrefined sources of rock phosphate. Another desirable improvement would be to provide a phosphorus supply which would be available over an extended period of time, such that the plant nutrient requirements are met without phosphorus toxicity. A still further advance in the art would be to provide a means for balancing the phosphorus levels so as to transfer phosphorus from plants which have an adequate or relatively high level of phosphorus to those deficient in phosphorus.

BRIEF SUMMARY AND OBJECTS OF THE INVENTION

The phosphorus fertilization system of the present invention consists of a primary package or enclosure which becomes functional following implantation into soil or other environment of plant growth. Functional components of the primary packaging include both a second package containing a source of soluble phosphorus compounds and propagules of MF or AB microorganisms (primary microorganisms) for transferring the phosphorus from the primary package into plants without adsorptive loss to the soil. Also included within the primary package are seeds or seedlings of a plant (vector plant) whose root system serves to promote the development of the primary microorganisms which come to form a network interconnecting the vector plant with a series of crop or other plants.

In the case of perrenial plants, the vector plant and associated microorganisms may simply engage a plant system whose root system is already interconnected by MF and AB. Fertilization occurs as phosphorus from the secondary package diffuses into the primary package, and is thence transferred sequentially by primary microorganisms into the vector plant and into the other recipient plants. The primary package is produced by combining the functional components in a fibrous or gel support structure which serves first as a vehicle for implanting the components into the soil, and later provides an environment for promoting growth of the organisms included within the package. Depending on the type of plant to be fertilized, the soil conditions and the means of deployment, the primary package may be dry, moist or wet; it may be configured of various shapes and sizes, and may be provided with an outer cover, container or envelope which serves to prolong the interaction between organisms originating in the package or capsule.

The second package, containing a source of phosphorus in a time-delay and timed-release form, has one of two configurations. In the first, the phosphorus is comprised of refined commercial phosphorus fertilizer formed into granules so as to release the fertilizer at an appropriate rate. The other type of second package contains unrefined and relatively insoluble forms of phosphorus in a unit termed a rock phosphate extraction unit. It contains a mixture of particles of finely ground rock phosphate or other insoluble phosphorus compound, a nutrient hydrogel matrix for bacteria and phosphobacteria comprising second microorganisms whose cell products are capable of converting or extracting soluble from insoluble forms of phosphorus. Exposure to moisture results in the slow but progressive hydration of the gel which then releases the nutrients which sustain the growth of phosphobacteria. The latter, in turn, act on the insoluble phosphorus compounds in the microenvironment provided by the gel, releasing soluble forms of phosphorus into the hydrated support matrix of the primary package.

The primary microorganisms consisting of mycorrhizal fungi or actinomycete bacteria, are key elements in the system since they are able to secure soluble forms of phosphorus from a variety of sources, including the soil and to transfer the phosphorus directly into the root of a plant without loss to surrounding soil constituents.

Propagules of the primary microorganisms for commercial production of the primary packages are produced by four novel techniques: one involves the use of infected propagative host plants which are grown hydroponically using either a fibrous support matrix or nutrient film technique to produce a concentrated inoculum consisting of plant roots and associated microorganisms. A second technique involves the propagation of epigeous species of microorganisms in association with host plants whose production of sporocarps or other fruiting bodies above the soil surface permits periodic harvesting of the propagules. A third technique involves co-culture of the microorganisms in association with germinating seeds and seedlings of an appropriate host plant. Co-incubation in a regulated microenvironment, or gemination chamber, leads to early infectivity of the plant roots and the development of a hyphal network of associated primary microorganisms. The infected seedlings can be deployed as pre-inoculated vector plants in a hydrated primary package, or they may be dissociated and the infected root fragments used as an inoculum for other vector plants included in the primary package. A fourth technique for the propagation of ectomycorrhizal fungi consists of incubating clean spores of a primary microorganism on a sterilized grain substratum inside a sterile plastic bag. In this case, mycorrhizal growth occurs in a sterile environment in which temperature and nutrients necessary for growth and the development of fruiting bodies can be controlled.

The primary packages arise by mixing the components together with a cellulosic vehicle and forming them into a desired shape either by extrusion of a hydrated viscous mass, or by paper product technology which involves a slurry or pulp. Fibrous primary packages may be prepared which remain moist, are dried at low temperatures, or are freeze-dried prior to deployment into the soil. Gel primary packages constitute an alternate means of deployment utilizing a highly hydrated matrix.

Inoculation of the package into soil under proper environmental conditions leads to germination and growth of the vector plant seed or seedling, and development of the primary microorganisms. Symbiotic relationships are formed between the two which allow the microorganisms to grow and become distributed within the soil and ultimately to interconnect the roots of adjacent plants which are to be fertilized. Thus, primary microorganisms come to form a network which functionally interrelates the root system of several plants so as to transfer soluble phosphorus from the package to plants as it emanates from within the package.

The MF and AB microorganisms may also buffer phosphorus levels between plants. Thus, they may translocate phosphorus from host plants containing a relatively high concentration to adjacent phosphorus-deficient plants. Additionally, primary microorganisms situated in soil containing soluble forms of phosphorus may secure and translocate phosphorus into associated plants. In all such exchanges, loss of the soluble phosphorus by adsorption to clay minerals and soil consituents is either minimized or does not occur since translocation is accomplished intracellularly through the highly elongate, primary microorganisms.

It is, therefore, a primary object of the present invention to provide a system for the biological transfer of soluble phosphorus to fertilize plants without substantial loss through adsorption to constituents of the soil.

Another object of the present invention is to provide for the conversion of insoluble rock phosphate into soluble forms of phosphorus by means of a complement of second phosphobacterial microorganisms within a nutrient hydrogel microenvironment.

Another object of the present invention is to provide a source of soluble phosphorus in a package subject to a timed-release mechanism so that phosphorus toxicity to plants can be minimized or avoided.

Still another object of the present invention is to employ a vector plant as a means for introducing mycorrhizal fungi and actinomycete bacteria so as to inoculate the soil with such microorganisms and to provide a means for establishing a symbiotic relationship with a series of nearby surrounding crop or other plant systems.

A further object of the present invention is to provide a mycorrhizal host (vector) plant as a recipient of soluble phosphorus arising from the package, to buffer and distribute it into a series of nearby plants, and as an agent for its conversion into biomass which is rich in organic forms of soluble phosphorus.

Another primary object of the present invention is to provide improved methods for propagating and mass producing mycorrhizal fungi and actinomycete bacteria.

Another object of the present invention is to provide a means for protecting and/or inducing reduced activity, inactivity or dormancy in propagules of the primary microorganisms so as to ensure their viability during packaging, storage, transportation and deployment.

Still another object of the present invention is to provide a means of packaging the mycorrhizal fungi vector plants and phosphorus source within a support medium so as to form an effective means for their introduction and growth in the soil.

These and other objects and features of the present invention will become more fully apparent from the following description and appended claims taken in conjunction with the accompanying drawings.

DETAILED DESCRIPTION OF THE PREFERRED EMBODIMENT

Reference is now made to the Figures wherein like parts are designated with like numerals throughout.

Figure 1:
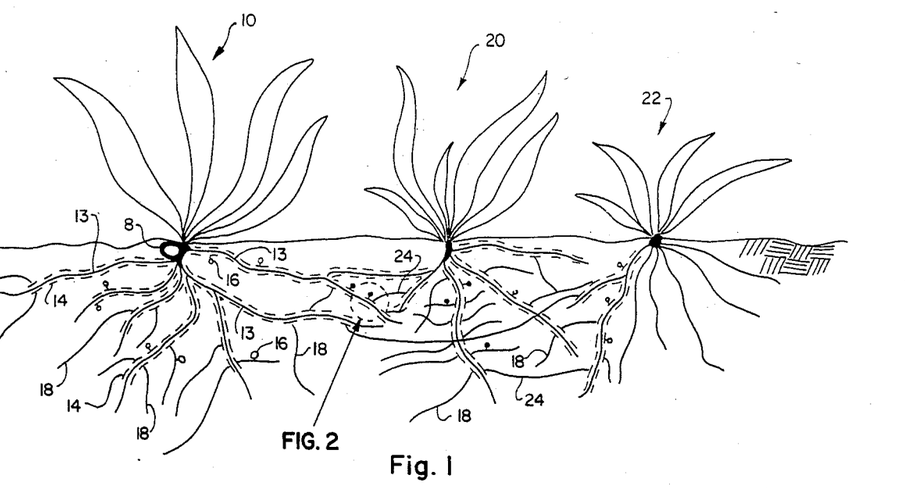
FIG. 1 is a schematic representation of one embodiment of the present invention as it functions in conjunction with VAM fungi and the root systems of plants.

Referring initially to FIG. 1, one embodiment of the invention is schematically illustrated as it actually functions in conjunction with plant root systems. In this figure, the host or "vector" plant, generally designated at 10, is shown in a growth state with a primary package or capsule 8 affixed to the upper portion of the root system 13 of plant 10. Vector plant 10 was initially contained within package 8 as a seed or seedling, along with one or more sources of soluble phosphorus as secondary packages, and propagules of AB, ecto-MF or endo-MF.

Vector plant 10 is an important constituent in this system with respect to both the propagation of the MF and AB within the soil environment. It is essentially impossible to introduce these microorganisms into a soil environment and have them survive without association with a plant host. As discussed more fully hereafter, this initial association is encouraged by including in the primary package the seed or seedlings of vector plant 10 so as to generate such a host plant. By initially developing this necessary relationship with plant 10, the microorganisms are provided with the nutrients and physical substratum necessary to sustain their growth.

As vector plant 10 grows, its extending roots give rise to additional cells which are then colonized by the microorganisms as they grow outward and/or downward and thereby introduce microorganisms throughout the soil. Soil hyphae 18 and inter-root hyphae 24 develop, and serve to interconnect the roots of the vector plant with other plants 20 and 22. The vector plant 10 is selected for its ability to grow and to establish an extensive root system interdigitating with that of the crop or other plants it is intended to supply with phosphorus and for the ability of its roots to maintain a connection in or upon the primary package 8. In addition, when vector plant 10 comprises a perennial plant, it provides a long-term host such that the fungi or bacteria may remain viable over periods of years, while maintaining a symbiotic relationship with recipient plants 20 and 22.

MF within capsule 8 become activated and form a symbiotic relationship with the roots 13 as vector plant 10 grows. The MF fungi are nourished by carbohydrates and other chemical exudates produced within cortical root cells of the growing plant 10. By reference to FIG. 2 taken in conjunction with FIG. 1, it is seen that the morphology of the primary microorganisms involves a variety of interconnected tubular structures and specialized appendages. AB and MF form morphologically specialized associations of hyphae with the plant root 13 consisting of a contiguous and confluent external net 14 on the surface of root 13 and an internal net 15 located in the root cortex 17. Endomycorrhizae also give rise to characteristic arbuscules 19 and vesicles 21 (FIG. 2) in the internal association.

Figure 2:
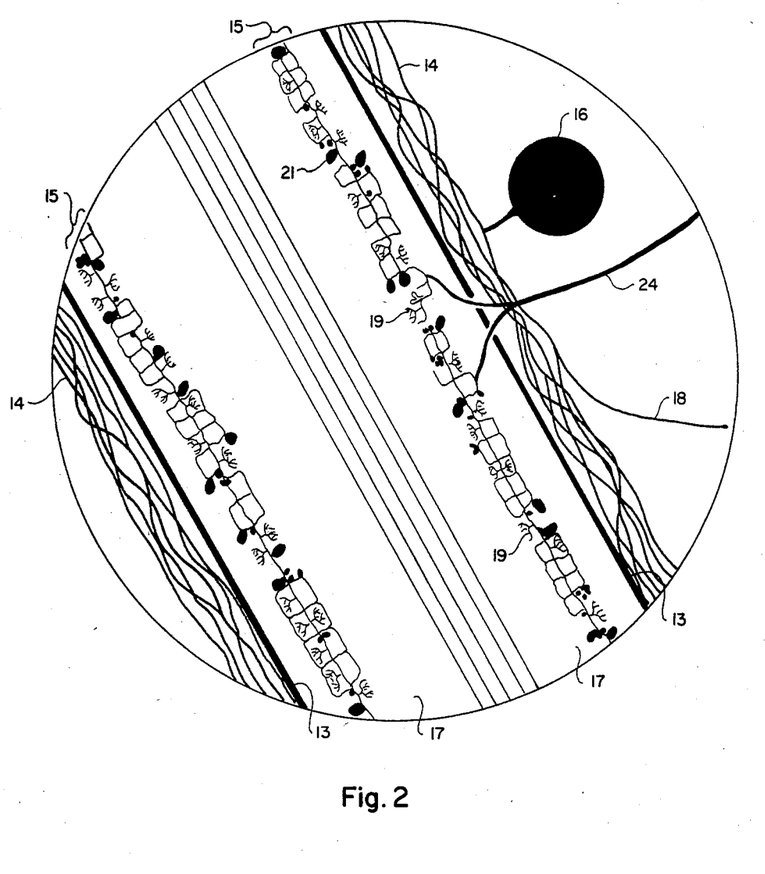
FIG. 2 is a magnified schematic cross-section illustrating that portion of the root system identified at 2 in FIG. 1.

Hyphae arising from the external net 14 may extend several centimeters from the root of the host plant 10. These hyphae may bear spores, or as mycelial constituents may give rise to sporocarps or sporangia. Some of the external hyphae may also extend outward to end blindly and may thus serve to recover nutrients from the surrounding soil or biomass. Such hyphae, which do not infect or interconnect roots, and which secure phosphorus or other nutrients from the surrounding soil, may be referred to as soil hyphae 18.

As the roots of vector plant 10 grow, successively more distal portions become infected by MF and AB, allowing the primary microorganisms to encounter the root systems of other plants such as those of plants 20 and 22 in FIG. 1. In addition to the initial relationship with cortical cells of plant 10, microorganisms will establish a symbiotic association with the other plants 20 and 22 and thus interconnect them. Hyphal connections between the roots of plants 10, 20 or 22 are referred to as inter-root hyphae 24. In the case of perrenial plants they may involve different species of AB and MF which interconnect the other plants before the introduction of the primary package and vector plants.

Through the inter-root hyphae 24, microorganisms may transfer phosphorus from a plant containing a relatively high concentration of phosphorus to one or more plants with a lower concentration. Thus, if a plant 10 has a high level of phosphorus, phosphorus may be translocated to a phosphorus-deficient plant through inter-root hyphae 24. Further, since the vector plant 10 may act as a medium through which phosphorus from primary package 12 is transferred, it may serve as a temporary reservoir and may buffer the quantity of phosphorus transferred to interconnected plants during a given period. It will also be noted that some of the phosphorus entering the interconnected plants will be converted to soluble organic forms by its incorporation into biomass during growth of the plants.

Figures 3, 4, 5, 6:
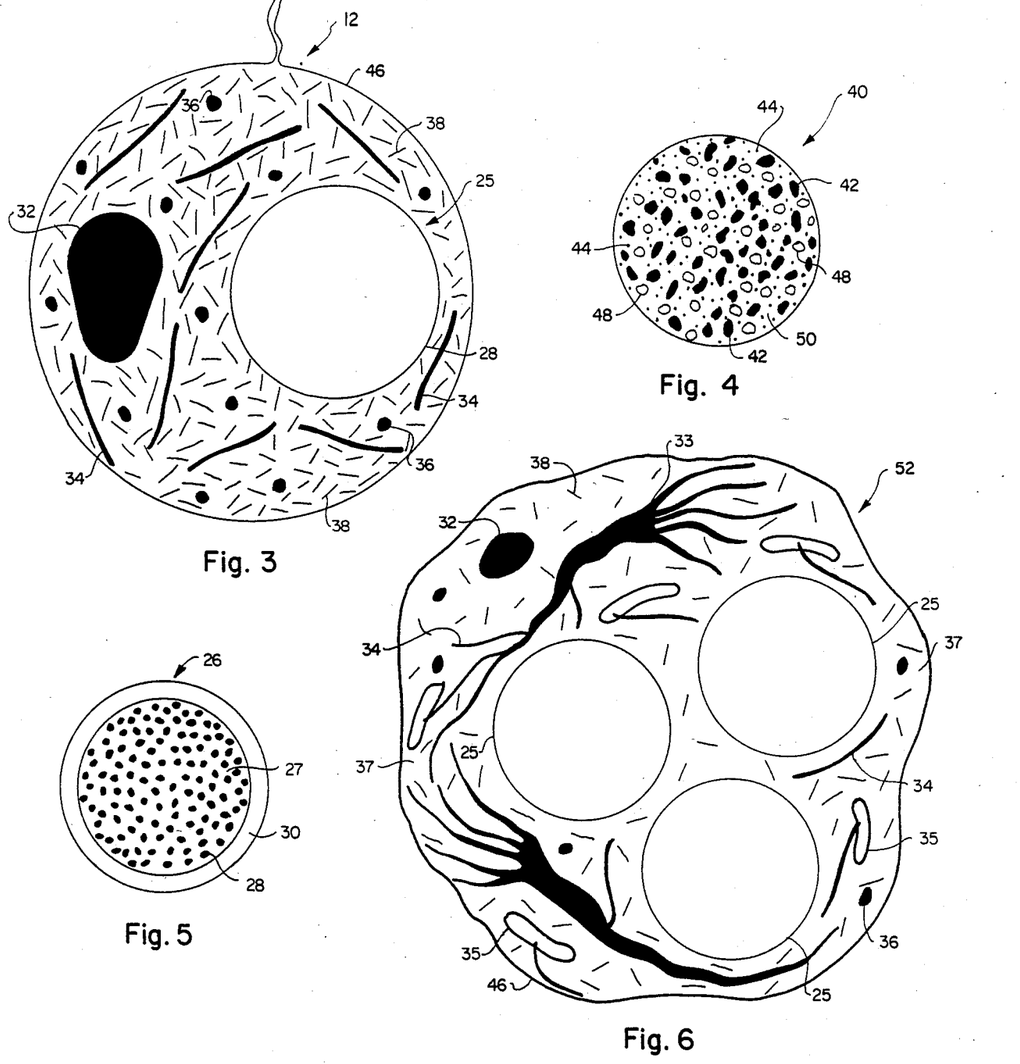
FIG. 3 is a cross-sectional illustration of a fibrous primary package which comprises one preferred embodiment of the present invention.
FIG. 4 is a cross-sectional illustration of one preferred embodiment of a rock phosphate secondary package for use in the claimed invention.
FIG. 5 is a cross-sectional illustration of a refined phosphorus secondary package which comprises another preferred embodiment for use in the claimed invention.
FIG. 6 is a cross-sectional illustration of a gel primary package which comprises a second preferred embodiment of the present invention.

By reference to FIG. 3, one preferred embodiment of the primary package 8 is illustrated as a fibrous package 12 which is either dry or moist and has the shape of a capsule, pellet or ball. Contained within the body of the fibrous package 12 are one or more secondary packages containing phosphorus generally indicated at 25. The secondary package 25 contains either a source of refined, commercially available soluble phosphorus fertilizer 26 (FIG. 4) in a timed-release form, or rock phosphate 40 (FIG. 5) in an extraction unit whose features will be hereinafter described in detail.

Also contained within the fibrous package 12 is the seed 32 of a vector plant selected from among plants of the same species or of different species to the plant species it is desired to fertilize. As heretofore described, the root system of the host plant generated from seed 32 will develop an association with that of crop or recipient plants 20 and 22.

The contents of fibrous package 12 comprise one or more species of primary microorganisms whose propagules are in the form of hyphae 34, spores 36, or vesicles. Of course, it will be recognized that there are multiple varieties of such microorganisms which could function in the necessary manner.

The above-discussed items contained within fibrous package 12 are surrounded by cellulosic fibers 38 which are comprised of a mixture of substances, such as sphagnum moss, paper pulp, and dissociated plant roots and shoots. This matrix is combined with an adhesive or gel-forming material 37, such as methylcellulose or is otherwise prepared so that the mixture will retain a preferred shape in order to be stored, transported and implanted into the soil as a primary package 8 (see FIG. 1).

Depending on the species of vector plant to be employed, the mode of deployment and the plant environment, the fibrous package 12 is enclosed by a container or envelope 46 permeable to water and strong enough to temporarily contain the developing root of the vector plant seedling 32 within the capsule and in proximity to propagules such as hyphae 34 and spores 36. The principal functions of fibrous package 12 are to insure inoculation of the vector plant and to preserve the MF "bridge" between the primary package and the vetor plant. As the plant arising from seed 32 grows, some of its roots penetrate or rupture the envelope 46 so as to extend outward into the soil while other retain association with the package. Envelope 46 can have multiple forms and be comprised of various types of materials such as cellophane wrapped around, or polyurethane coated upon the surface, or a fibrous bag within which components of package 12 are placed.

Various novel methods are used for producing propagules of the microorganism. In the first, the root systems of propagative host plants are inoculated and grown hydroponically either on a cellulosic or other fibrous substratum, or using a thin-film apparatus. In both cases it is possible to optimize the conditions for growth of the microorganisms by regulating the environment of the plant and its root system. Thus, it is possible to change the temperature, humidity, atmospheric gases, nutrients and light levels to maximize the development of root-associated hyphae, and to provide various types and quantities of fibrous materials to promote hyphal growth and spore development around the propagative host plant roots.

Maturation of the microorganisms forming the propagules may be fostered by a combination of maturation and/or harvesting of portions of the host plant, together with regulation of temperature, nutrients, root gases, light, and moisture. By these means, a highly concentrated and pure inoculum of MF propagules can be prepared in mass as part of an independent and commercially viable hydroponic agricultural enterprise, such as that involving the production of lettuce.

According to a second approach for producing propagules, epigeous species of microorganisms capable of producing sporangia or sporocarps above the soil surface are grown in association with host plants in the soil. For example, a perennial grass host plant can be used which allows sporocarps of certain VA fungi to be harvested together with the shoots of the host. This involves first mowing the grass and then agitating and vacuuming the soil surface. Alternatively, the sporocarps or sporangia of other MF microorganisms may be harvested from the soil surface when trees or similar perennial plants are cultivated as hosts. Thus, fruiting bodies of certain ectomycorrhizal fungi develop from the roots of certain trees in a fashion permitting them to be periodically harvested from the soil surface.

A third method for producing propagules of the primary microorganisms consists of incubating an inoculum of a particular microorganism in association with germinating seeds or seedlings of a propagative host plant, which may also be a vector plant or a crop plant. By growing the two together, the developing root or root system of the young plant becomes infected with the microorganisms, and hyphal propagules are formed which can be used to infect other plants. The process of incubation and co-culture occurs in a clean or sterile environmentally controlled chamber which is substantially free of AB and MF prior to placing the inoculum within the chamber. Thus, the chamber contains no other species of AB or MF and it therefore promotes the development only of the organisms selected and fosters the production of an internal and external hyphal net and associated MF and AB structures. Growth and maturation of the primary microorganisms can be regulated by altering the environment. Infected propagative host seedlings are then either maintained in a viable and non-dormant condition during incorporation into wet or moist primary packages, or they are dissociated and th plant fragments incorporated into the support structure of other types of moist or dry primary packages.

A fourth method for producing propagules of ectomycorrhizal fungi consists of incubating clean or surface sterilized spores of a particular species on a substratum of a moist, sterilized grain, such as rye grain. The clean or sterilized spores are mixed in sterile water to form a mixture which is then inoculated into an enclosure or container such as a bag which contains the moist, sterilized grain. The enclosure can also contain hormones and nutrients for providing a source of nourishment for the microorganisms. The inoculation procedure is carried out by means of a sterilized syringe and needle. One preferred method employs plastic bags within which heat sterilization of the grain can be carried out prior to inoculation. The bags are then used as an incubation chamber for growth of the microorganisms on the substratum such that eventual maturation and production of the fruiting bodies which contain the spores can occur. During incubation, the bags are provided with an opening which may be connected to a source of gases and water so that they may pass through the opening without permitting introduction of contaminating spores of other fungi or bacteria. The opening also permits retention of moisture within the bag to permit growth of the fungus over the moist grain substrate until propagules and/or the production of spores occurs.

The formation of the primary package involves several different techniques. Dry packages are produced by mixing propagules protected against drying and/or freeze-drying together with a cellulosic support medium at low temperature. A package may be formed either by extruding a hydrated mixture to form capsules or pellets or by using paper technology to fabricate a ribbon, strip, or corrugated cardboard-type package, using paper product technology. The packages are formed at a low temperature in the range of 4° centigrade to 17° centigrade, and the residual moisture of packages is removed either by allowing it to evaporate, or by rapidly freezing and drying at low temperature of about 4° centigrade to prevent germination or loss of viability of the fungal propagules and plant seed. Due to the presence of soluble and adhesive components in the secondary package 25 it is important to effect the formation of the primary package rapidly so the secondary packages can be restored to a dry condition before the time delay or sustained release mechanisms are activated by exposure to moisture. The packages are optionally covered by an envelope so as to promote inoculation of the vector plant with the MF. Dry packages, protected against the loss of moisture, and containing MF hyphae 34 and MF spores 36, in an inactive or dormant state, are stored until such time as capsule 12 is placed in the soil either manually or by means of appropriate agricultural implements.

Moist fibrous packages are produced using the same mixture and the same extrusion or paper-making techniques described for the dry fibrous packages. However, the packages are allowed to remain in a moist state prior to their introduction into the soil. In order to increase the storage period of the moist packages, they are stored at temperatures below that of the ambient room air. The period of storage is directly affected by the temperature since any temperature below that of the ambient air in the room will retard growth of the vector plant and microorganisms. This growth becomes more retarded as the temperature decreases down to about 4° centigrade. The storage periods appear to be the longest when temperatues are in the range of about 4° centigrade to about 17° centigrade.

From the above discussion it will be recognized that even when the packages are retained at low temperatures, a shorter period of time in storage is permissible. This is due to the tendency of the vector plant and the non-dormant primary microorganisms to grow and to the ability of the secondary packages to become hydrated when all coexist together in the moist matrix. However, storage time can be further increased by producing incomplete moist packages containing propagules of the primary microorganisms in a fibrous or gel support medium and storing the separate packages at low temperatures in the range of about 4° centigrade to 17° centigrade. The packages can subsequently be completed by combining them with the secondary phosphorus packages and vector plant seeds or seedlings by means of an adhesive, a wrapping of securing material, or a bag which would serve to unite all of the essential constituents.

Wet packages whose support medium consists of a gel or a gel and fibrous matrix can be used to include all of the active constituents of the primary package as a highly hydrated unit. Advantages of the wet package are that both the primary microorganisms and vector plant seedlings pre-inoculated by microorganisms can be deployed in such packages in an active state with no delay in their continued development upon introduction into the soil. Thus, optimal conditions for continuing growth and development of plants bearing MF and AB can be provided by transplantation in a liquid or gel medium which protects them from injury during mixing, transport and introduction into the definitive growth location.

Wet packages are useful both for the establishment of propagative host plants to be grown under hydroponic conditions and for vector plants grown in the soil. When used in the field, an aliquot of the complete primary package mixture may be injected directly into the soil using fluid drilling equipment to form a bolus. This bolus is capable of retaining its physical integrity and providing an optimal environment for the growth of its living constituents during the initial period of vector plant establishment in the soil. Alternatively, the complete primary package mixture may be contained within an envelope, tube or bag which is subsequently placed in th soil or other growth environment where it undergoes controlled disintegration during development of the vector or propagative host plant.

All types of wet packages involve mixing of the components shortly before the primary packages are put into use, and such mixing can conveniently be effected in batches on a small scale with commonly available equipment such as that used to prepare concrete. The consistency of the final mixture for the primary package is fully controlled by the addition of gel-forming substances to the fibrous support medium.

Activation of the various types of packages involves exposure to proper environmental conditions of sunlight, temperature, and water. Upon activation of the plant seed 32, MF hyphae 34 and spores 36 begin to grow. The plant arising from the seed 32 becomes vector plant 10 of FIG. 1 which develops the first symbiotic relationship with the MF 34 and 36. As the roots of the vector plant 10 extend into the soil, newly formed cells are colonized by MF. The MF then grow within the soil providing contact between some hyphae 24 and the roots of nearby plants. As the soil hyphae 18 and inter-root hyphae 24 continue to grow and extend outward, they interconnect the root system of plants 10, 20, and 22, and they enlarge the effective size of the rhizosphere of these plants by increasing the volume of soil from which phosphorus is obtained. It is noted that the MF hyphae 18 and 24 may extend 7 to 10 centimeters from their original host plant.

Secondary packages containing a source of phosphorous are formed in various ways. In one embodiment of this invention, the secondary package generally indicated at 25 comprises one or more rock phosphate extraction units containing a second type of biological organism which acts upon rock phosphate or other insoluble inorganic phosphorus compounds to produce soluble phosphorus. The phosphorous from the secondary package is then transferred to the plant root system in a manner identical to that described above. The configuration of such a phosphorus source is illustrated in FIG. 4.

The phosphorus extraction unit 40 of FIG. 4 includes a collection of rock phosphate particles 42 which contain insoluble or slightly soluble phosphorus compounds ground to a powder so that the particle sizes are in the range from approximately 5 to approximately 50 micrometers.

Also within extraction unit 40 are the second microorganisms referred to hereafter as phosphobacteria 44 which include species of Bacillus, Pseudomonas and Agrobacterium. Species of phosphobacteria 44 are selected for use based on their ability to ensporulate, to be handled in a dry and a dormant form, to germinate and grow in an aqueous gel microenvironment, and to efficiently act upon rock phosphate within the gel to produce soluble phosphorus compounds. These phosphobacteria 44 are propagated under culture conditions in order to provide a large number of specimens, and they are then subjected to physical conditions which induce them to ensporulate and to enter a dormant state. The dormant spores and bacteria 44 are dried and maintained in a dry and cool condition to provide for maximal viability during packaging, handling and storage.

A dehydrated nutrient hydrogel 48 which contains the constituents necessary to form an effective phosphobacterial growth medium when in the hydrated state constitutes the matrix of the extraction unit 40. More precisely, the nutrient hydrogel 48, when hydrated, constitutes a complete microenvironment. It thus contains constituents necessary to promote growth of the phosphobacteria 44 following germination, and to sustain such growth for periods ranging from weeks to months. The hydrogel 48 is additionally constituted to maintain the pH within the phosphorus extraction unit 40 at a predetermined level so as to provide optimal conditions for growth of the phosphobacteria 44 and mobilization of the soluble phosphorus compounds derived from the rock phosphate particles 42.

The nutrient hydrogel 48 is comprised of one or more of such gel forming materials as hydroxymethyl cellulose, agar, sugars of large molecular weight or acrylimides, with these materials being combined with germination agents and nutrients such as ribosides, glucose, organic anions, cations, Ca-dipicolinate, and buffering agents. The materials to be used in the gel are mixed to form a compound, particles of which will progressively become hydrated when exposed to water and which will initiate and sustain the growth of phosphobacteria 44 for an extended period of time. The nutrient hydrogel mixture is prepared as a powder having a preferable particle size within the range of approximately 5 to 50 micrometers. A portion of the hydrogel particles 48 may be coated with or contain a water-retardant agent to provide an additional measure of control over the timed-release process and for the staged growth of the phosphobacteria 44 which extends the duration of the phosphorus extraction process.

The mixture of rock phosphate particles 42, phosphobacteria 44, and hydrogel 48 is then compressed together with an appropriate binder 50 to form a phosphorus extraction unit 40 (secondary package) whose size and shape is appropriate for a given primary package. The binder 50 is selected on the basis of its ability to unite the constituents without injury to the phosphobacteria 44 during compression and for its ability to progressively admit moisture so as to permit regulated hydration of the nutrient hydrogel 48.

In use, the phosphorus extraction unit 40 remains storable and easily transportable so long as it is kept dry. Temporary exposure to moisture during fabrication of the primary package, as heretofore described, will not compromise the time delay or sustained release mechanisms of the extraction unit 40 if the primary packages are either deployed within a period of a few days, or are restored to an appropriate condition of dryness. Upon prolonged exposure to moisture, phosphorus extraction unit 40 provides a support and growth medium for the ensporulated phosphobacteria 44. Hydration of the nutrient hydrogel particles 48 at the surface of the unit makes the nutrients contained therein available to the phosphobacteria 44 which then become active. The invading moisture does not react with all hydrogel particles 48 simultaneously, but rather, the moisture intrudes slowly so that hydration of the dehydrated gel and solvation of the nutrients within hydrogel particles 48 occurs in a timed-release manner. By this means, the phosphobacteria 44 are provided both with a long-term source of nourishment and an appropriate aqueous environment.

After activation of the phosphorus extraction unit 40, the phosphobacteria 44 in the vegetative state begin to act upon the rock phosphate particles 42 within extraction unit 40 such that the phosphorus within those particles is converted into soluble compounds suitable for providing nourishment to plant root systems. Although the phosphorus extraction unit 40 may be used independently and placed in the soil near the rhizosphere of a plant root system in order to provide a direct source of soluble phosphorus for that plant, it is anticipated that its principal use will be as a secondary package in conjunction with a primary package.

By reference to FIG. 5, a second preferred embodiment of the secondary package 25 is illustrated as a refined phosphorus granule generally indicated at 26 whose components exist in a time-delay and timed-release configuration. Granule 26 is comprised of a core of commercially available soluble phosphorus fertilizer 28 with a coating 30 resistant to moisture which serves to delay the release of the phosphorus after its exposure to water. Molten sulfur, epoxy resins or other polymer, or slowly hydratable compounds can be employed to form the coating 30. The soluble phosphorus fertilizer 28 of the core is first mixed with an appropriate binder 27 and then formed by compression into granule 26. The binder or vehicle has the ability to become progressively hydrated and thus provides for the sustained and timed-release of phosphorus from the granule 26.

By reference to FIG. 6, a second preferred embodiment of the primary package 8 is illustrated as a wet or moist capsule, ball or bolus generally illustrated at 52 whose support matrix is a gel. Contained within the body of the hydrated gel package 52 are one or more secondary packages 25 or 40 which constitute a source of soluble phosphorus, a seed 32 and/or a seedling 33 of a vector plant, propagules consisting of spores 36 or root fragments 35 infected with hyphae 34, and a hydrated gel-like support matrix 38. The matrix 38 may optionally include cellulosic fibers. By comparison of the hydrated gel package 52 with the fibrous package 12 of FIG. 3, it is noted that the same functional constituents are present in both. However, the presence of a hydrated gel support matrix in package 52 permits the inclusion and maintenance of microorganism propagules 36, 34 and vector plant seedling 33 in an active state. The degree of development of the vector plant seedling 33 further permits the prior inoculation of its root with AB or MF microorganisms. Depending on conditions in the soil and the mode of deployment, the hydrated gel package 52 may or may not be provided with an outer envelope 46 in the form of a bag or tube within which the constituents are situated. The hydrated gel package 52 permits either continuing activity or rapid activation of the AB or MP microorganisms and the early development of vector plant seedling 33. In all other respects the packages 12 and 52 are identical in the use to which they are applied.

Figure 7:
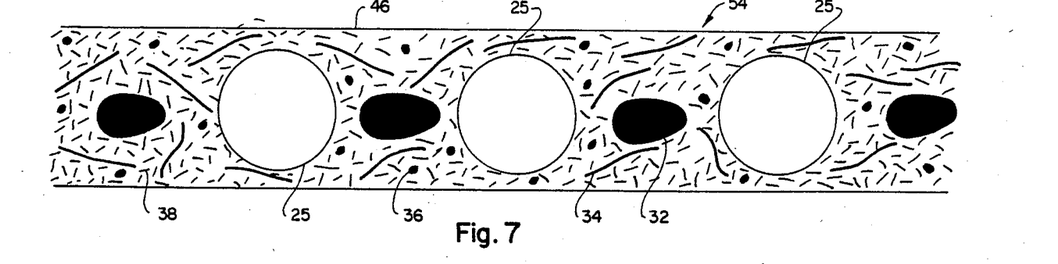
FIG. 7 is a cross-sectional illustration of a ribbon, strap or slab which comprises a third preferred embodiment of the present invention.

By reference to FIG. 7, another preferred embodiment for a primary package 8 serving as a source of phosphorus fertilizer is illustrated. In this embodiment, a ribbon, strap or slab generally indicated at 54 constitutes an alternate mode of deployment. By comparison of the phosphorus source ribbon 54 of FIG. 7 with the dry or moist fibrous package 12 of FIG. 3, it is noted that the structure and content is essentially identical with the exception of the physical configuration or positioning of the constituents. In FIGS. 3, 5 and 6, the contents of the secondary package 25 containing phosphorus are not illustrated since the packages 25 may contain either the refined phosphorus fertilizer granules 26 as illustrated in FIG. 5 or rock phosphate extraction units 40 as illustrated in FIG. 4.

In constructing ribbon, strap or slab gel packages 54, the methods of mixing are similar to those used in producing fibrous package 12. After the constituents are combined in a gel-like mixture they are formed into a continuous sheet using extrusion and flattening and/or paper forming techniques. The sheet is then coated to form a "sandwich" whose upper and lower leaves form a laminated sheet which in effect serves as an envelope 46. The continuous ribbon 54 may function in a manner identical to that described for packages 12 and 52. The ribbon 54 may be stored in a roll configuration and may be mechanically delivered as required for inoculation into the soil or used to create pledgets which are individually placed.

From the foregoing description it will be appreciated that the novel phosphorus fertilizer system disclosed herein clearly overcomes many of the longstanding problems in the art by (1) providing a means for delivering soluble phosphorus to plant root systems without appreciable adsorptive loss of the phosphorus to clay minerals in the surrounding soil; (2) providing a means for extracting soluble phosphorus compounds from rock phosphate without the complex commercial chemical processes of refinement; (3) providing a phosphorus supply which is available to plant root systems over an extended time period; (4) providing a means for delivering phosphorus to plural plant root systems; (5) providing a means for distributing and balancing the overall phosphorus level in plural plant systems so as to transfer phosphorus from those plants having adequate or excess phosphorus to those plants deficient in phosphorus; (6) providing a means for preparing and packaging fungal microorganisms for storage and transport, and for rapid activation upon introduction into said environments; and (7) providing a means for the introduction and distribution of plant-beneficial fungal microorganisms into soil environments. In addition, the components of this system are all contained in a form which permits storage and which facilitates their transport and implantation into the soil without harm to the biological components of the system.

The invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for producing microorganisms for use as soil inoculants comprising the steps of:
   obtaining an environmentally controlled enclosure;
   placing selected microorganisms within the enclosure;
   placing at least one germinating host plant source within the enclosure in proximity to the selected microorganisms;
   incubating the selected microorganisms and the germinating host plant source within the enclosure so that the selected microorganisms can infect at least one root developing from the host plant source; and
   incorporating the infected host plant source with a source of phosphorus on a support means, to form an apparatus for delivering phosphorus to plants.

2. A method for producing microorganisms as defined in claim 1, wherein the step of obtaining an environmentally controlled enclosure comprises the step of obtaining such an enclosure which is substantially free of mycorrhizal fungi and actinomycete bacteria.

3. A method for producing microorganisms as defined in claim 1, further comprising the step of forming hyphal propagules from the microorganism infected root, said hyphal propagules being useable for infecting other plants with the microorganisms.

4. A method for producing microorganisms as defined in claim 1 wherein the host plant source comprises at least one of the following: (a) a plant seed; and (b) a plant seedling.

5. A method for preparing microorganisms for use as soil inoculants comprising:
   obtaining microorganisms suitable for encouraging plant growth;
   packaging the microorganisms in an environment containing moisture and a source of soluble phosphorus and in proximity to a host plant means; and
   cooling and maintaining the packaged microorganisms, environment, and host plant means at low temperatures above the freezing point of water prior to inoculation into soil, so as to slow activity of the microorganisms and to slow growth of the host plant prior to said inoculation.

6. A method for preparing microorganisms as defined in claim 5 wherein the step of packaging the microorganisms comprises the step of placing said microorganisms in a fibrous support medium which is capable of hydration and which also supports the host plant means.

7. A method for preparing microorganisms as defined in claim 5 wherein the step of packaging the microorganisms comprises the step of packaging the microorganisms in proximity to at least one of the following: (a) a plant seed; and (b) a plant seedling.

8. A method for preparing microorganisms as defined in claim 5 further comprising the step of enclosing the environment, microorganisms, source of soluble phosphorus and host plant means in a container which is permeable at least to water, said container being configured so as to permit escape of plant roots from within the container after infection of said roots by said microorganisms.

* * * * *

UNITED STATES PATENT AND TRADEMARK OFFICE
CERTIFICATE OF CORRECTION

PATENT NO. : 4,589,225

DATED : May 20, 1986

INVENTOR(S) : Larry J. Stensaas

It is certified that error appears in the above-identified patent and that said Letters Patent is hereby corrected as shown below:

Column 8, line 66, "other" should be --others--
Column 11, line 43, "th" should be --the--
Column 12, lines 4-5, "phosphorous" should be --phosphorus--
Column 12, line 11, "The phosphorous from" should be --The phosphorus from--

Signed and Sealed this

Nineteenth Day of August 1986

[SEAL]

Attest:

DONALD J. QUIGG

Attesting Officer

Commissioner of Patents and Trademarks